United States Patent [19]

Okada

[11] Patent Number: 4,905,472

[45] Date of Patent: Mar. 6, 1990

[54] AXLE DRIVING APPARATUS

[75] Inventor: Hideaki Okada, Takarazuka, Japan

[73] Assignee: Kanzaki Kokyukoki Mfg. Co. Ltd., Japan

[21] Appl. No.: 304,588

[22] Filed: Feb. 1, 1989

[30] Foreign Application Priority Data

Feb. 3, 1988 [JP] Japan .................................. 63-24195

[51] Int. Cl.[4] ............................................. F16D 31/02
[52] U.S. Cl. ........................................ 60/464; 60/487;
  60/494; 180/53.4; 180/307
[58] Field of Search ................. 60/464, 494, 487, 490,
  60/453, 454, 484, 485; 91/505; 180/305, 307,
  53.1, 53.4

[56] References Cited

U.S. PATENT DOCUMENTS

| | | | |
|---|---|---|---|
| 2,945,382 | 7/1960 | Ritter et al. ..................... | 180/53.4 X |
| 3,131,539 | 5/1964 | Creighton et al. ..................... | 60/487 |
| 3,430,438 | 3/1969 | Weiss . | |
| 3,499,285 | 3/1970 | Nicholls ..................... | 60/487 |
| 3,687,212 | 8/1972 | Forster . | |
| 3,903,698 | 9/1975 | Gellatly et al. ..................... | 60/464 X |
| 3,944,010 | 3/1976 | Winter et al. . | |
| 4,324,275 | 4/1982 | Ward ..................... | 60/494 X |
| 4,616,478 | 10/1986 | Jensen ..................... | 91/505 X |
| 4,627,237 | 12/1986 | Hutson . | |

FOREIGN PATENT DOCUMENTS 3239223 10/1982 Fed. Rep. of Germany .

*Primary Examiner*—Edward K. Look
*Attorney, Agent, or Firm*—Saidman, Sterne, Kessler & Goldstein

[57] ABSTRACT

An axle driving apparatus which laterally divides a transmission casing into two, a hydraulic pump vertically disposing a pump shaft and a hydraulic motor horizontally disposing a motor shaft are fixed in one transmission casing, the hydraulic pump and hydraulic motor are tight enclosed within the transmission casing in the state of joining both the transmission casing, an oil passage connecting the hydraulic pump and hydraulic motor is open at the bottom surface of the transmission casing, and an oil passage plate provided with connecting oil passages, a short-circuit valve, check valves and oil filter, is attached to the portion of the opening.

4 Claims, 5 Drawing Sheets

AXLE DRIVING APPARATUS

FIELD OF THE INVENTION

The present invention relates to an axle driving apparatus with a hydro-static-transmission used as a propulsion apparatus for a tractor.

DESCRIPTION OF THE PRIOR ART

An axle driving apparatus has hitherto been well known which vertically divides a casing thereof, journals axles at the divided surfaces, and drives the axles by a hydro-static-transmission attached to the casing, and disclosed in, for example, the Japanese Utility Model Publication Gazette No. Sho 62-44198 and the Japanese Patent Laid-Open Gazette No. Sho 62-101945 filed by the same applicant.

In the prior art, however, a hydro-static-transmission separate from the axle driving apparatus is exposed outside the casing of axle driving apparatus, whereby the axle driving apparatus is large-sized as a whole and larger in the gross weight. Also, in order to drive the horizontally disposed axles by a motor shaft of a hydraulic motor disposed vertically and outside the apparatus, bevel gears must be interposed in both the driving systems.

Also, there is inconvenience such that a reserve tank to compensate operating oil in the hydro-static-transmission, or in order to use lubricating oil in or driving casing as the operating oil, a pipe or an oil passage for connecting the driving casing and hydro-static-transmission must particularly be required.

SUMMARY OF THE INVENTION

An object of the invention is to provide an axle driving aparatus which contains a hydraulic motor and a hydraulic pump constituting the hydro-static-transmission into a transmission casing comprising one transmission casing 1 and the other transmission casing 2 laterally divided, and forms an oil passage for connecting the hydraulic motor M and hydraulic pump P at the bottom wall of the transmission casing.

The above and further objects and novel features of the invention will more fully appear from the following detailed description when the same is read in connection with the accompanying drawings.

DESCRIPTION OF THE PREFERRED EMBODIMENT

Next, an embodiment of an axle driving apparatus of the invention will be described in accordance with the accompanying drawings.

Figure 1:
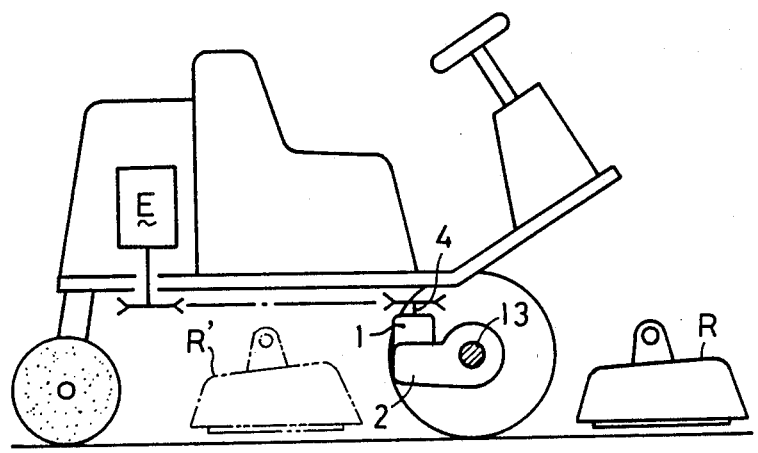
FIG. 1 is a side view of a light tractor provided with an axle driving apparatus of the invention.

Referring to FIG. 1, a tractor loading an engine E of a vertical crank shaft is shown.

A pulley is fixed to the vertical crank shaft at the engine E and transmits the power through a belt to a pulley fixed to a pump shaft 4 at a hydraulic pump P.

The tractor is attached in front or under the body with rotary mowers R and R' to thereby mow a lawn.

The axle driving apparatus of the invention drives axles 13 for the tractor.

Next, explanation will be given on construction of the axle driving apparatus in accordance with FIGS. 2, 3, 4, 5 and 6.

A transmission casing is laterally divided by the vertical into one side transmission casing 1 and the other side one 2 which are joined.

A pump mounting surface 1a is formed at the bottom wall of one transmission casing 1 and a rising wall adjacent and vertical to the pump mounting surface 1a is formed to be a motor mounting surface 1b.

One side transmission casing 1 is open above the pump mounting surface 1a and covered by a lid 34.

Figure 3:
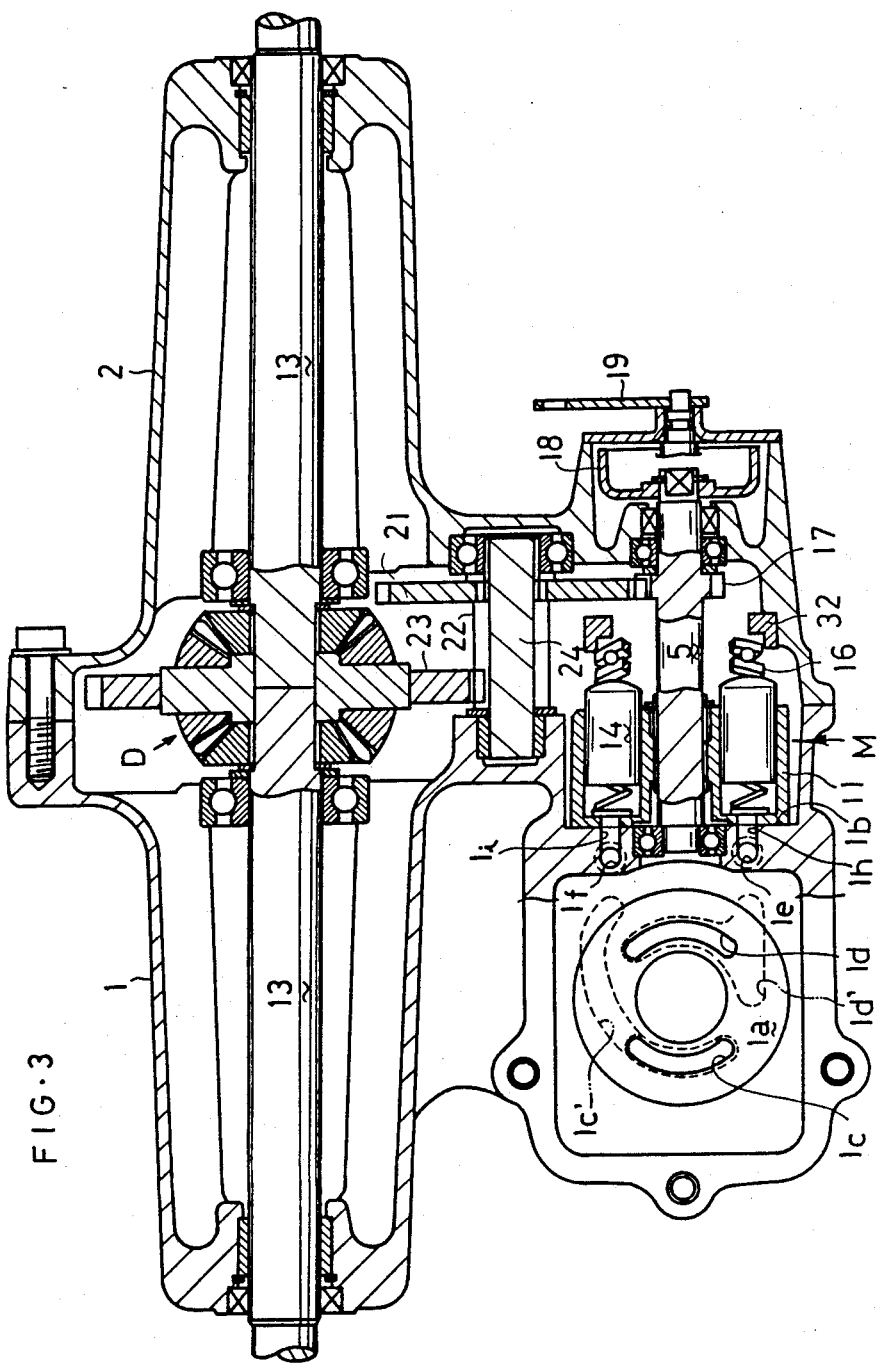
FIG. 3 is a sectional plan view of the same.

Prior to covering the opening by the lid 34, the hydraulic pump P is mounted on the pump mounting surface 1a. FIG. 3 shows the state where the hydraulic pump P is not yet mounted.

At the center portion of the pump mounting surface 1a are formed a bearing bore for supporting the base of a pump shaft 4 and a pair of crescent-shaped oil passages 1c and 1d at the suction and discharge sides for delivery of operating oil between the hydraulic pump P and the hydraulic motor M.

The hydraulic pump comprises a cylinder block 10, pistons 12 and the pump shaft 4. When the pump shaft 4 rotates the cylinder block 10, the pistons 12 fitted into piston holes at the cylinder block 10 vertically slide to discharge pressure oil.

A thrust bearing 15 abutting against the heads of pistons 12 is fixed to a variable swash plate 9. A speed change lever shaft 6 turns the variable swash plate 9 so as to vary an amount and the discharge direction of the pressure oil. A detent unit 20 is provided to reliably hold the variable swash plate 9 at the neutral position.

Figure 4:
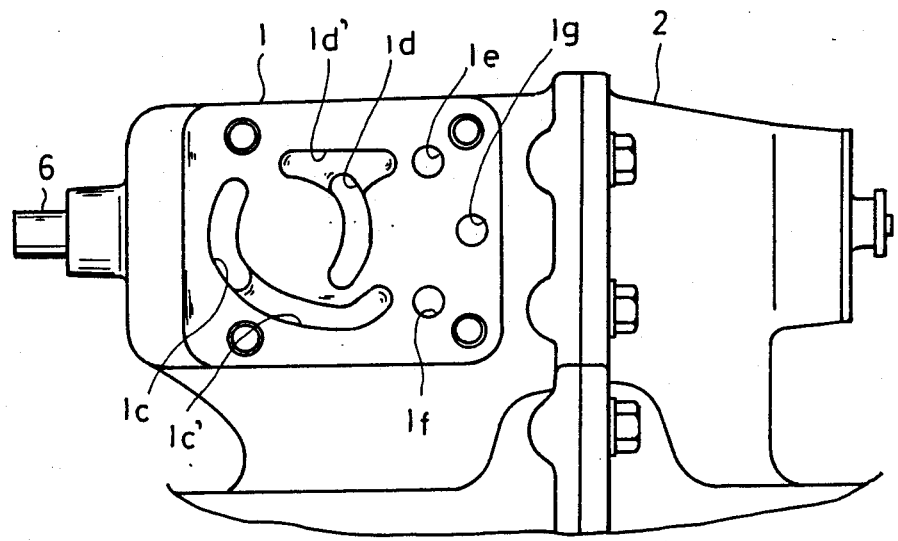
FIG. 4 is a sectional view taken on the line I—I in FIG. 2.

A pair of crescent-shaped oil passages 1c and 1d formed in the pump mounting surface 1a at the one transmission casing 1, as shown in FIG. 4, directly perforate the bottom wall of one side transmission casing 1 and are open at the rear surface of the bottom wall.

Oil grooves 1c' and 1d' communicating with the crescent-shaped oil passages open at the rear surface of the bottom wall are formed in order to facilitate connection with an oil passage plate 3 to be discussed below, which are crescent-shaped when viewed from the rear.

Meanwhile, vertical walls are erected from the four sides of the pump mounting surface 1a in a manner of surrounding the hydraulic pump P. In order to mount the hydraulic motor M on the wall among the four vertical walls facing the other side transmission casing 2, a motor mounting surface 1b is formed.

The motor mounting surface 1b, as the same as the pump mounting surface 1a, is provided with a bearing bore for supporting the base of motor shaft 5 and a pair of crescent-shaped oil passages 1h and 1i.

The hydraulic motor M comprises a cylinder block 11, pistons 14 and the motor shaft 5, the heads of the pistons 14 always abutting against a thrust bearing 16 fixed to a fixed swash plate 32 supported to the other transmission casing 2. The pistons 14, when subjected to oil pressure from the hydraulic pump P, are intended to expand, which is converted into rotation along the thrust bearing 16, thereby rotating the cylinder block 11 and motor shaft 5.

Two oil passages 1e and 1f communicating with the crescent-shaped oil passages 1h and 1i are bored in the vertical wall from the rear side of the bottom wall.

Therefore, the oil grooves 1c' and 1d' and oil passages 1e and 1f are open on the rear surface of the bottom wall of the one side transmission casing 1 as shown in FIG. 4, which are connected with each other to form the closed circuit of the hydraulic pump P and hydraulic motor M, whereby the oil passage plate 3 is bonded to the rear surface of the bottom wall of the transmission casing 1.

At the surface of oil passage plate 3 bonded to the bottom wall surface of the one side transmission casing 1 are formed an oil groove 3f through which the oil groove 1c' communicates with the oil passage 1e and an oil groove 3e through which the oil groove 1d' communicates with the oil passage 1f.

Figure 5:
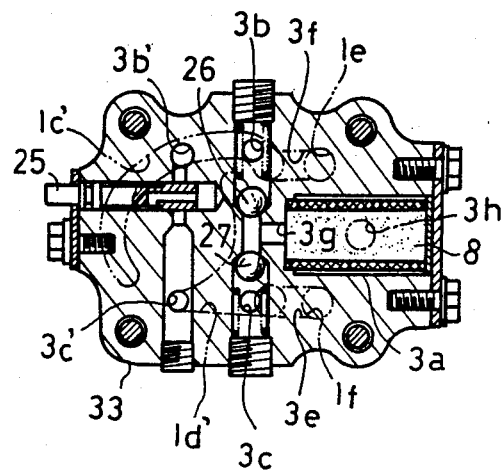
FIG. 5 is a sectional view taken on the line II—II in FIG. 2.
Figure 6:
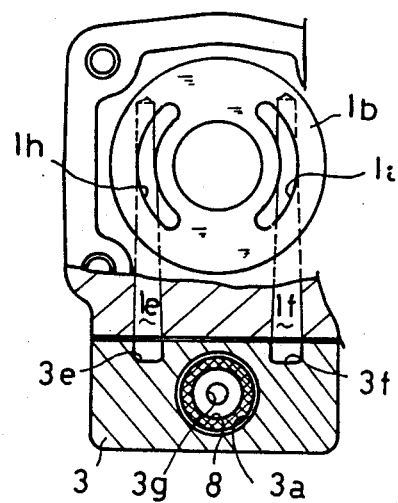
FIG. 6 is a sectional view taken on the line III—III in FIG. 2.

The oil passages 3b and 3c communicating with the oil grooves 1c' and 1d' are formed downwardly so that, as shown in FIG. 5, check valves 26 and 27 are disposed in the oil passages 3b and 3c, and an operating oil suction port 3g is provided between the check valves 26 and 27 and communicates with an insertion bore 3a for the oil filter 8.

The insertion bore 3a for the oil filter 8 communicates with the oil bath in the transmission casing through the oil passages 1g and 3h.

At the oil passage plate 3, a short-circuit valve 25 is interposed between the oil passages 3b' and 3c' communicating with the oil grooves 1c' and 1d', and bored downwardly respectively, so that when the hydraulic motor M is freely rotated in a case where a vehicle provided with the axle driving apparatus is hauled, the closed circuit is adapted to be short-circuited.

A gear 17 is provided on the motor shaft 5 of the hydraulic motor M and a brake drum 18 is fixed to one end thereof.

The brake drum 18 is braked by brake shoes expanded by a brake arm 19.

The hydraulic motor M is disposed at the joint portion between the transmission casings 1 and 2.

Figure 2:
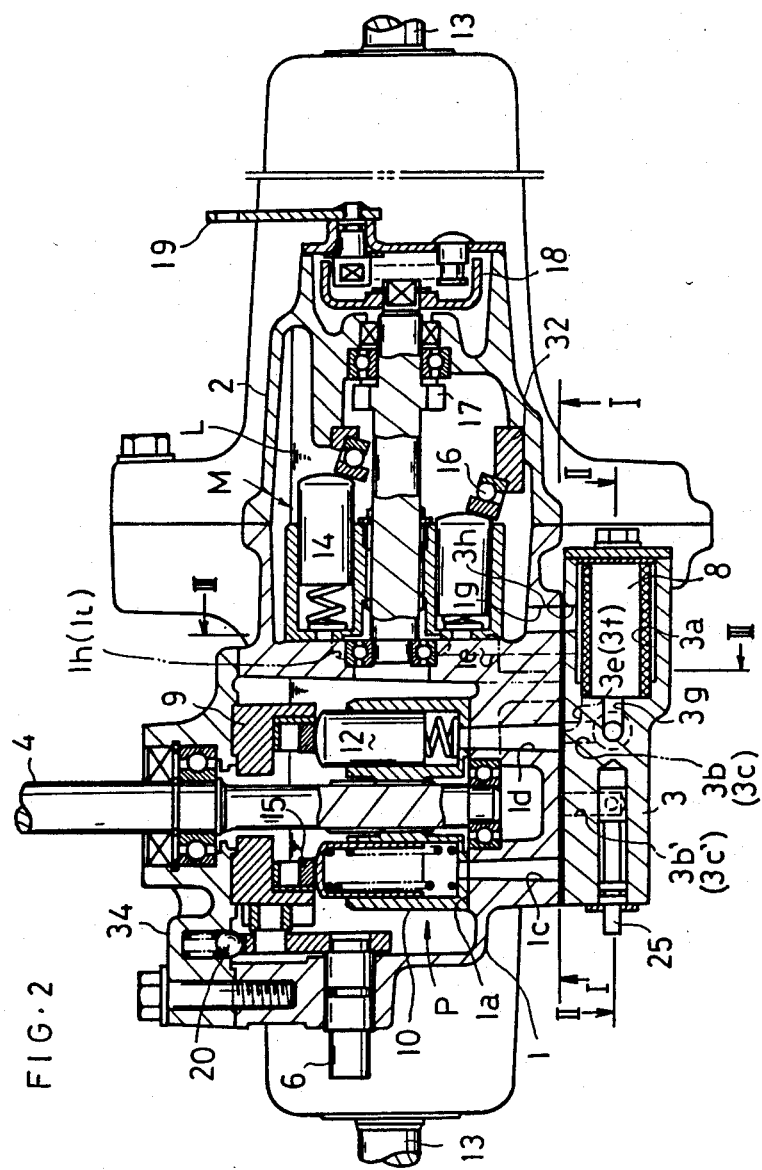
FIG. 2 is a sectional front view thereof.

In addition, in FIG. 2, reference character L designates the level of lubricating oil.

The gear 17 at the motor shaft 5 engages with a large diameter gear at the counter shaft 24, a pinion 22 thereon engages with a ring gear 23 at the differential gear unit D. The axles 13 and motor shaft 5 are disposed in parallel to each other laterally of the differential gear unit D.

Next, explanation will be given on the effect of the invention.

The one side transmission casing 1 and the other side one 2 are laterally joined to form the transmission casing. The hydraulic pump is vertically disposed at the bottom wall surface of one side transmission casing 1, the hydraulic motor M is horizontally disposed at the side surface of the rising, and the oil passage plate 3 is disposed at the bottom surface of the one side transmission casing, whereby the hydraulic pump P and hydraulic motor M constituting the hydro-static-transmission can reasonably and compactly be disposed therein, thereby enabling the axle driving apparatus to be small-sized. Also, since the oil passage plate 3 constituting the precise oil passages is separate from the transmission casing and mounted to the lower portion of the one side transmission casing 1, the apparatus is easy to assemble, inspect and repair.

Since the short-circuit valve 25 is provided at part of the oil passage plate 3, the short-circuit valve 25 is operated to short-circuit the oil passage for the motor M, the axles and hydraulic motor M are freely rotatable during the traction.

Since the oil passage 1g is provided at the transmission casing, the oil passage 3h is provided at the oil passage plate 3 and communicates with the interior of the transmission casing through the oil passages 1g and 3h, operating oil in the transmission casing is guided into the insertion bore 3a at the oil filter 8, and the check valves 26 and 27 communicating with the insertion bore 3a are provided, the lubricating oil in the transmission casing can be introduced as the operating oil for the hydro-static-transmission, whereby there is no need of providing an operating oil tank at the exterior or the filter casing at the exterior.

The oil filter 8 is disposed at the portion of the insertion bore 3a at the oil passage plate 3, whereby there is no need of providing the filter casing outside the transmission casing. Hence, the oil passage plate 3 can be compact.

While a preferred embodiment of the invention has been described using specific terms, such description is for illustrative purpose only, and it is to be understood that changes and variations may be made without departing from the spirit or scope of the following claims.

What is claimed is:

1. An axle driving apparatus characterized in that:
    a transmission casing laterally divided so that left and right axles are journalled at left and right transmission casings respectively;
    a hydraulic pump driven by an engine and a hydraulic motor subjected to oil pressure from said hydraulic pump to be driven thereby are enclosed in said transmission casing;
    a pump mounting surface for said hydraulic pump is formed on the inner surface of the bottom of one of said divided transmission casings, a pump shaft of said hydraulic pump being vertically disposed;
    a motor mounting surface for a hydraulic motor is formed on the surface of a rising wall adjacent to said pump mounting surface and opposite to the other transmission casing, a motor shaft being disposed in parallel to said axles;
    a pair of crescent-shaped oil passages formed on said pump mounting surface are open at the rear surface of the bottom wall at said transmission casing;
    oil passages communicating with a pair of crescent-shaped oil passages formed on said motor mounting surface are open at the rear surface of the bottom wall; and
    an oil passage plate for connecting oil passages for said hydraulic pump and those for said hydraulic motor is bonded to the rear surface of the bottom wall of said transmission casing.

2. An axle driving apparatus according to claim 1, characterized in that two oil passages communicating with pairs of crescent-shaped oil passages at said pump mounting surface and motor mounting surface are bored at said oil passage plate, and a short-circuit valve, through which both said two oil passages are connectable, is disposed at said oil passage plate.

3. An axle driving apparatus according to claim 1, characterized in that an oil passage communicating with the interior of said transmission casing is open at the bottom thereof and said oil passage plate, said oil passage communicate with an operating oil suction port bored between said pair of crescent-shaped oil passages at said pump mounting surface, and a pair of check valves for supply operating oil to said two oil passages are disposed at both sides of said operating suction port.

4. An axle driving apparatus according to claim 3, characterized in that an insertion bore for an oil filter is open in said oil passage for communicating the interior of said transmission casing with the interior of said oil passage plate.

* * * * *

UNITED STATES PATENT AND TRADEMARK OFFICE
CERTIFICATE OF CORRECTION

PATENT NO. : 4,905,472

DATED : March 6, 1990

INVENTOR(S) : Hideaki Okada

It is certified that error appears in the above-identified patent and that said Letters Patent is hereby corrected as shown below:

Column 6, line 2, after "passage", insert --plate in communication with said oil passage--.

Signed and Sealed this

Eighteenth Day of June, 1991

Attest:

HARRY F. MANBECK, JR.

*Attesting Officer*

*Commissioner of Patents and Trademarks*